United States Patent
Chou et al.

(10) Patent No.: US 11,977,475 B1
(45) Date of Patent: May 7, 2024

(54) METHOD AND APPARATUS FOR COMPILER AND LOW-LEVEL INSTRUCTION VALIDATION OF MACHINE LEARNING OPERATIONS ON HARDWARE

(71) Applicant: Marvell Asia Pte Ltd, Singapore (SG)

(72) Inventors: Chien-Chun Chou, Morgan Hill, CA (US); Senad Durakovic, Palo Alto, CA (US); Ulf Hanebutte, Gig Harbor, WA (US); Harri Hakkarainen, Los Gatos, CA (US); Yao Chou, Sunnyvale, CA (US); Veena Karthikeyan, Mountain View, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/684,940

(22) Filed: Mar. 2, 2022

Related U.S. Application Data

(60) Provisional application No. 63/230,606, filed on Aug. 6, 2021.

(51) Int. Cl.
*G06F 11/36* (2006.01)
*G06F 8/41* (2018.01)
*G06N 3/02* (2006.01)

(52) U.S. Cl.
CPC ............ *G06F 11/3624* (2013.01); *G06F 8/44* (2013.01); *G06N 3/02* (2013.01)

(58) Field of Classification Search
CPC .......... G06F 8/41; G06F 8/44; G06F 11/3624; G06N 3/02

(Continued)

(56) References Cited

U.S. PATENT DOCUMENTS

| | | | |
|---|---|---|---|
| 2019/0286973 A1* | 9/2019 | Kovvuri | G06N 3/04 |
| 2019/0295282 A1* | 9/2019 | Smolyanskiy | G01S 13/931 |
| 2021/0158197 A1* | 5/2021 | Costello | G06N 20/20 |

FOREIGN PATENT DOCUMENTS

| | | | | |
|---|---|---|---|---|
| WO | WO-2017038104 A1 * | 3/2017 | | G06N 3/02 |
| WO | WO-2020211205 A1 * | 10/2020 | | G06F 11/3058 |
| WO | WO-2021036893 A1 * | 3/2021 | | |

OTHER PUBLICATIONS

Piñeyro, Leonardo, et al., Structure verification of deep neural networks at compilation time using dependent types, SBLP '19: Proceedings of the XXIII Brazilian Symposium on Programming Languages, Sep. 2019, 8 pages, [retrieved on Dec. 20, 2023], Retrieved from the Internet: <URL:http://dl.acm.org/>.*

(Continued)

*Primary Examiner* — Geoffrey R St Leger

(57) ABSTRACT

A system to support validation and debugging of compiled low-level instructions for a machine learning (ML) network model on an ML-specific hardware. A compiler identifies well-defined boundaries in the ML network model based on primitives used to generate low-level instructions for the hardware. The ML network model is partitioned into units/layers/sub-graphs based on the plurality of well-defined boundaries. The compiler then generates an internal representation for each of the units wherein the internal representation is mapped to components in the hardware. Each of the units is compiled into a first set to be executed on the ML-specific hardware and a second set to be executed on a second computing device. The output results from executing the two sets of low-level instructions are compared to validate the first set of low-level instructions. If the outputs do not match fully, the first set of low-level instructions is debugged and recompiled.

34 Claims, 10 Drawing Sheets

(58) Field of Classification Search
USPC .................................................. 717/124, 140
See application file for complete search history.

(56) References Cited

OTHER PUBLICATIONS

Humphrey, Greer B., et al., Improved validation framework and R-package for artificial neural network models, Environmental Modelling & Software, vol. 92, Jun. 2017, 25 pages, [retrieved on Dec. 20, 2023], Retrieved from the Internet: <URL:https://www.sciencedirect.com/science/article/pii/S136481521630963X>.*

* cited by examiner

```
"layers": [
  { "id": 1, "op": "CONV", "to_layer_ids": [ 2 ], "tvmgen_name": "tvmgen_mrvl_main_1",
    "first_onnx_op": "ssd0_resnetv10_conv0_fwd", "last_onnx_op": "ssd0_resnetv10_relu0_fwd",
    "strategy_applied": [split_io:yes, split_wb:no, split_in_time:no, overlap:no,matmul:SAMM2
  ],
    "external_strategy_hints": [ ],
    "cut_points": [ "tvmgen_mrvl_main_6" ],
    "fused_in_tvmgen_layers": [ "tvmgen_mrvl_main_0" ],
    "ddr_weight_bias_meta_names": [ ],
    "data_match": { "delta": 2, "float_small_diff_value_treated_as_0": "0.0007" },
    "first_inst_id": 1, "last_inst_id": 51,
    "io_operations_ocm_usage_bytes": 723841, "weights_biases_ocm_usage_bytes": 20736,
    "peak_ocm_usage_per_tile_bytes": 744577,
    ...
    code_gen: { io: split_io, wb: dupl_wb },
    mapping_info: { batch_size: 1, per_batch_num_tiles: 32,
      per_batch_mapping_list: [
        { tid:0,input:16,padded:19,to_nxt:-3,halo:5,image:21,y_steps:8,x_steps:256,output:8
  },
        { tid:1,input:16,padded:16,to_nxt:-3,halo:5,image:21,y_steps:8,x_steps:256,output:8
  },
        ...
        { tid:30,input:16,padded:16,to_nxt:-3,halo:5,image:21,y_steps:8,x_steps:256,output:8
  },
        { tid:31,input:16,padded:19,to_nxt:0,halo:0,image:21,y_steps:8,x_steps:256,output:8
  },
      ], },
    inputs: [ { N:1, inH:512, inW:512, inC:3, inCStride:3, dataFormat:NCHW, name:data,
          ddr_addr:0x29480, ocm_addr_start:0x5140, ocm_addr_end:0x15c7f } ],
    weight: { outC: 64, kH: 7, kW: 7, inC: 3, name: tvmgen_mrvl_main_1_const_0, ddr_addr:
0x8000,
          ocm_addr_start: 0x0, ocm_addr_end: 0x4fff },
    bias: { kind: FP32, outC: 64, name: tvmgen_mrvl_main_1_const_5, ddr_addr: 0x28e80,
          ocm_addr_start: 0x5000, ocm_addr_end: 0x50ff },
    outputs: [ { N:1, outH:256, outW:256, outC:64, outCStride:64, ocm_addr_start:0xaffc0,
          ocm_addr_end:0x100000, name:tvmgen_mrvl_main_1_Conv2DRelu }
  },
  { "id": 2, "op": "MAXPOOL", "to_layer_ids": [ 3, 6 ], "tvmgen_name":
"tvmgen_mrvl_main_6",
    "first_onnx_op": "ssd0_resnetv10_pool0_fwd", "last_onnx_op":
"ssd0_resnetv10_pool0_fwd",
    "strategy_applied": [ ],
    "external_strategy_hints": [ ],
    "cut_points": [ "tvmgen_mrvl_main_7", "tvmgen_mrvl_main_23" ],
    "ddr_weight_bias_meta_names": [ ],
    "data_match": { "delta": 2, "float_small_diff_value_treated_as_0": "0.0007" },
    "first_inst_id": 52, "last_inst_id": 190,
    "io_operations_ocm_usage_bytes": 297921, "weights_biases_ocm_usage_bytes": 0,
    "peak_ocm_usage_per_tile_bytes": 297921
    ...
    mapping_info { ... },
    outputs: [ { N: 1, outH: 128, outW: 128, outC: 64, outCStride: 64, ocm_addr_start:
0x55fc0,
          ocm_addr_end: 0x66000, name: tvmgen_mrvl_main_6_Maxpool2D } ],
  },
  { "id": 3, "op": "CONV", "to_layer_ids": [ 4 ], "tvmgen_name": "tvmgen_mrvl_main_7",
    "first_onnx_op": "ssd0_resnetv10_stage1_conv0_fwd",
    "last_onnx_op": "ssd0_resnetv10_stage1_relu0_fwd",
    "strategy_applied": [ ],
    "external_strategy_hints": [ ],
    "cut_points": [ "tvmgen_mrvl_main_12", "tvmgen_mrvl_main_23" ],
    "ddr_weight_bias_meta_names": [ ],
    "data_match": { "delta": 2, "float_small_diff_value_treated_as_0": "0.0007" }
    "first_inst_id": 191, "last_inst_id": 193,
    "io_operations_ocm_usage_bytes": 4609, "weights_biases_ocm_usage_bytes": 8448,
    "peak_ocm_usage_per_tile_bytes": 13057
    mapping_info { ... },
    outputs: [ { N: 1, outH: 128, outW: 128, outC: 64, outCStride: 64, ocm_addr_start:
0x97bc0,
          ocm_addr_end: 0xafc00, name: tvmgen_mrvl_main_7_Conv2DRelu } ],
  },
  ...
]
```

FIG. 2

```
int mllib_Int8Memset (
uint64_t addr,
uint64_t linelen,
uint64_t linestride,
uint64_t numlines,
uint64_t value);

Example call: mllib_Int8Memset(0x100, 256, 64, 32, -1)
```

FIG. 5A

```xml
<?xml version="1.0"?>
<cfg>
   <TITLE>Cavium ML Config Description</TITLE>
   <chip>
      <!-- Global configuration parameters -->
      <numTests>10</numTests>
      <dumpIsa>1</dumpIsa>
      <dumpData>1</dumpData>

<!-- Test percentages -->
      <pctInt8Memset>100</pctInt8Memset>

<!-- Int8Memset configuration parameters -->
      <Int8Memset_minNumLines>1</Int8Memset_minNumLines>
      <Int8Memset_maxNumLines>7</Int8Memset_maxNumLines>
      <Int8Memset_minLineLen>1</Int8Memset_minLineLen>
      <Int8Memset_maxLineLen>321</Int8Memset_maxLineLen>
      <Int8Memset_minLineBubble>0</Int8Memset_minLineBubble>
      <Int8Memset_maxLineBubble>64</Int8Memset_maxLineBubble>
      <Int8Memset_minValue>-10</Int8Memset_minValue>
      <Int8Memset_maxValue>10</Int8Memset_maxValue>

</chip>
</cfg>
```

FIG. 5B

```
1  //1
2  PETaskBcst 3 0x1 3 0 0 0 0 0
3  PELoadRegImm 0x1 0 16 0 1 1 1
4  PEMove 0x1f 0x1 16 0 0 1 1 48
5  PEStoreStream 0x0 16 16 16 256 3 0 0 0
6  //2
7  PETaskBcst 1 0xffffffffffffffff 2 0 0 0 0 0
8  PESync
9  //3
10 PETaskBcst 6 0x1 3 0 0 0 0 0
11 PELoadRegImm 0x1 503 16 0 1 1 1
12 PEMove 0x1f 0x1 16 0 0 1 1 20
13 PEStoreStream 0x0 16 16 5 134 4 0 0 0
14 PELoadRegImm 0x1 503 12 0 1 1 1
15 PEMove 0x1f 0x1 12 0 0 1 1 4
16 PEStoreStream 0x50 12 134 4 0 1 0 0 0
17 //4
18 PETaskBcst 1 0xffffffffffffffff 2 0 0 0 0 0
19 PESync
20 //5
21 DMATaskBcst 2 0x1 3 0 0 0 0 0
22 DMA OCM to DDR 0x0 0x80000000 256 256 2 0 1
23 DMA OCM to DDR 0x200 0x80000200 24 0 1 0 1
```

FIG. 5C

METHOD AND APPARATUS FOR COMPILER AND LOW-LEVEL INSTRUCTION VALIDATION OF MACHINE LEARNING OPERATIONS ON HARDWARE

RELATED APPLICATION

This application is a nonprovisional application and claims the benefit and priority to a provisional application No. 63/230,606 that was filed on Aug. 6, 2021, which is incorporated herein by reference in its entirety.

BACKGROUND

Use and implementations of machine learning (ML) and artificial intelligence (AI) methods on electronic devices has become ubiquitous. The design of a hardware architecture of the electronic devices, whether a processor, a programmable logic, a dedicated hardware such as application specific integrated circuit (ASIC), or a dedicated ML hardware, often goes through various optimization and compilation processes. In order to perform an operation/run (e.g., an inference operation) of an ML network model written in certain high-level programming language on a general-purpose CPU and/or a specialized hardware accelerator, a binary executable file including a set of low-level executable instructions/code and model-specific data sections have to be generated. This is typically done in an ahead of time fashion (AOT) by a compiler, utilizing Application Programming Interface (API) calls into a low-level library. The compilation typically includes mapping of the ML network model (e.g., a neural network) to a specific number of hardware components, lowering the precision of the ML network model, e.g., transforming the ML network model to half precision (e.g., fp16), and/or quantizing the ML network model to, e.g., int8.

To ensure that the compiled low-level instructions execute the ML model operation correctly and within expected accuracy, both the compiler and the low-level instructions must be extensively validated and debugged if needed. Since both the compiler and the library are evolving over time, the validation and regression process must be continuously performed (which is often referred to as Continuous Integration or CI). The validation space is nearly infinitely large, as new ML network models with different tensor shapes, different network layouts and different data types, and quantization requirements are emerging.

Currently, validation and debugging are performed at different stages of the compilation and ML network model transformation process in isolation, where unit tests that are specific to a particular stage in the process are often utilized. For some specific networks, an end-to-end validation process may be performed where the developer responsible for a specific ML operation or transformation will provide a unit test that is limited to that specific operation. As such, the unit test is often overly simplified in order to generate a reference result with ease.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a non-limiting example of layer ids and attribute descriptions of a list of sub-graphs mapped to components of the ML-specific hardware according to one aspect of the present embodiments.

FIG. 5A depicts a non-limiting example of an ML library call (Int8Memset) for a unit test according to one aspect of the present embodiments; FIG. 5B depicts a non-limiting example of the XML file specifying the unit test for Int8Memset according to one aspect of the present embodiments; FIG. 5C depicts a non-limiting example of the set of low-level instructions (e.g., in ISA format) generated by the ML library call Int8Memset according to one aspect of the present embodiments.

DETAILED DESCRIPTION

Figure 1:
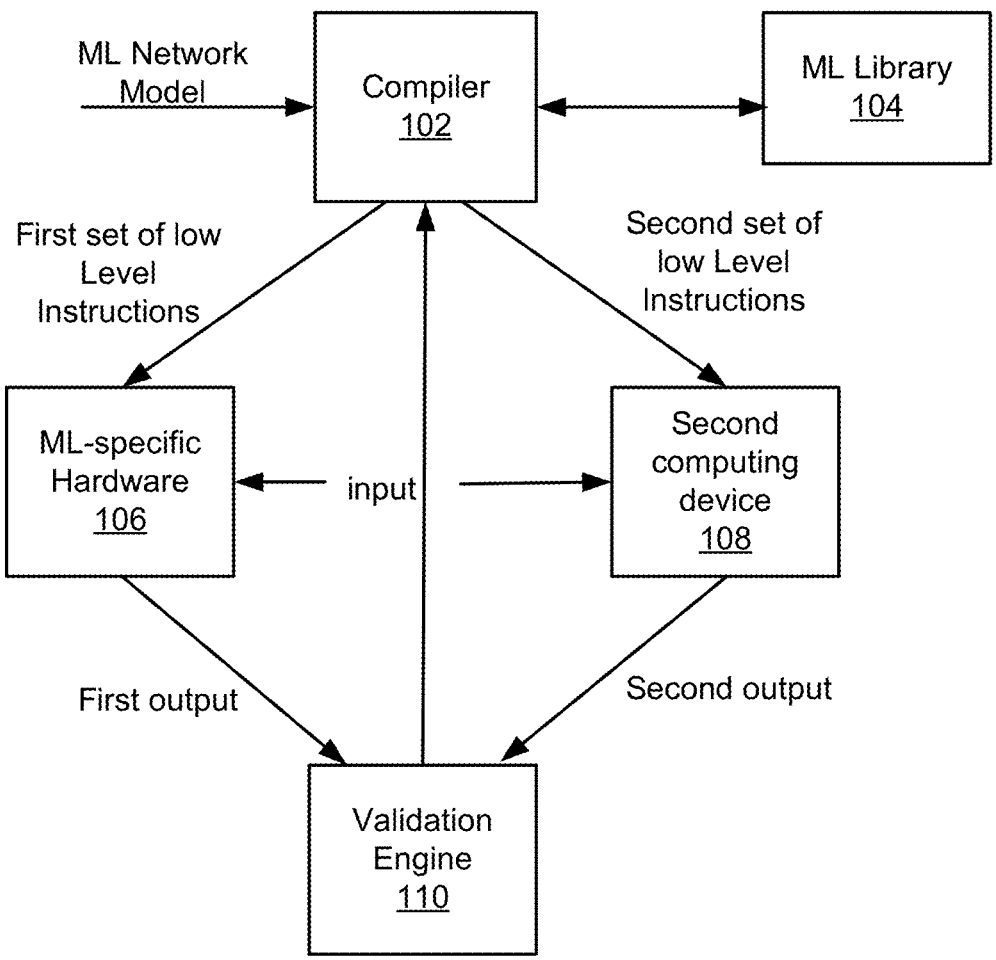
FIG. 1 depicts an example of a diagram of a system to support validation and debugging of compiled low-level instructions being executed on an ML-specific hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A holistic approach is proposed that contemplates systems and methods to support validation and debugging of compiled low-level instructions for an ML network model comprising a plurality (e.g., tens or hundreds) of ML operations to be executed on a first computing device, e.g., an ML-specific hardware. First, a compiler identifies a plurality of well-defined boundaries in the ML network model based on a set of primitives used to generate low-level instructions for the first computing device via corresponding ML library calls. The ML network model is then partitioned into a plurality of units/layers/sub-graphs based on the plurality of well-defined boundaries. The compiler then generates an internal representation for each of the plurality of units, wherein the internal representation is mapped to one or more components in the first computing device. Each of the plurality of units is compiled into two sets of low-level instructions—a first (e.g., to-be-verified) set to be executed on the one or more hard components in the first computing device and a second (e.g., proven) set to be executed on a second computing device. Once the two sets of low-level instructions for each of the plurality of units have been loaded and executed on the first computing device and the second computing device, respectively, the output results from executing the two sets of low-level instructions are compared to validate the first set of low-level instructions. If the outputs do not match fully, the compiler is configured to debug and recompile the first set of low-level instructions within the plurality of well-defined boundaries. Here, the first computing device is an ML-specific hardware or a software emulator of the ML-specific hardware, wherein the ML-specific hardware is a dedicated hardware including one or more microprocessors and/or on-chip memory (OCM) units storing the data and/or the first set of low-level instructions to perform the plurality of ML operations. The second computing device can be but is not limited to a general-purposed computing device (e.g., a general CPU or GPU), a special-purposed hardware (e.g., another (second) ML hardware that is different from the (first) ML-specific hardware), or a software simulator or emulator of a hardware. In some embodiments, the first computing device and the second computing device are two separate devices. In some embodiments, the first computing device and the second computing device are different components and/or chips integrated on a same physical device.

In addition to performing small unit tests, which may be internal to the compiler and only cover specific aspect/functions of the ML network model, the proposed holistic approach combines unit-level testing of the compiler with ML library components and enables validation of end-to-end flow of the full or partial ML network model represented as either a complete or various kinds of sub-graphs and compiled to different precisions. As such, the proposed approach performs divide-and-conquer and provides a better assessment of the overall compiler quality in terms of low-level instructions compiled to be executed on the ML hardware. By generating or selecting randomly but judicially, specific units or sub-graphs for validation runs, the proposed approach reduces the time/resource required for the validation process, while guaranteeing a given breadth of coverage. In addition, the validation process covers multiple aspects simultaneously and provides answers to debugging, performance and data accuracy of the low-level instructions generated by the compiler for the ML hardware.

Although an instruction set architecture (ISA) is used as a non-limiting example of the low-level instruction format to be executed on the ML-specific hardware to illustrate the proposed approach in the embodiments described below, it is appreciated that the same or similar approach is equally applicable to other types of low-level instructions. Although an ML-specific hardware (e.g., inference engine) is used as a non-limiting example of the hardware where the low-level instructions are executed to illustrate the proposed approach in the embodiments described below, it is appreciated that the same or similar approach is equally applicable to other types of hardware, e.g., a FPGA-based simulator executing actual register transfer level (RTL) for the ML-specific hardware, or a software simulator or emulator for the ML-specific hardware for verification, debugging, and optimization purposes. Moreover, although an ML network model is used as a non-limiting example of an application in high-level code to illustrate the proposed approach in the embodiments described below, it is appreciated that the same or similar approach is equally applicable to other types of software applications including but not limited to firmware, hardware simulation software, or RTL simulation software.

FIG. 1 depicts an example of a diagram of a system to support validation and debugging of compiled low-level instructions being executed on an ML-specific hardware. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system includes a compiler (compiling engine) 102, an ML library 104, a first computing device (e.g., an ML-specific hardware) 106, a second computing device 108, and a validation engine 110. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

In the example of FIG. 1, the compiler 102 is configured to accept an ML network model, which is pre-trained and comprises a plurality (e.g., tens, hundreds, or thousands) of ML operations described in high-level code, wherein the high-level code includes a plurality of high-level functions/operators each called at one or more lines in the high-level code. For a non-limiting example, an ML operation can be a dense and/or regular operation, e.g., a matrix operation such as multiplication, matrix manipulation, tanh, sigmoid, etc. For another non-limiting example, an ML operation can be a sparse or irregular operation, e.g., memory transpose, addition operation, operations on irregular data structures (such as trees, graphs, and priority queues), etc. Here, the high-level code is a software code written through a commonly-used high-level programming language (e.g., C, C++, or Python). In some embodiments, the ML network model can be represented by a neural network used for ML applications, wherein the neural network can be complex and huge in size. For non-limiting examples, the neural network can be but is not limited to one of a convolution neural network (CNN), a recurrent neural network (RNN), a gradient boosting machine (GBM), and a generative adversarial neural network.

In some embodiments, the compiler 102 is configured to identify a plurality of well-defined boundaries for input and output in the ML network model based on a set of primitives. Here, the set of primitives refer to a set of functions, units, and/or operators that are basic, generic, and essential (in contrast to specialized) to the ML operations of the ML network model. Each of the primitives may invoke one or more library function calls to an ML library 104 to generate low-level instructions to be executed on a hardware. For a non-limiting example, a library function is called to perform a matrix-matrix-multiplication of two matrices of given sizes and the ML library 104 returns the set of low-level instructions that are needed to perform this library function, wherein the set of low-level instructions includes one or more of loading data from a memory (e.g., on chip memory or OCM) into registers, executing dot-product, and storing the data back into the memory.

Once the plurality of well-defined boundaries are identified, the compiler 102 is configured to partition the ML network model into a plurality of units/layers/sub-graphs based on the plurality of well-defined boundaries. In some embodiments, the boundaries are defined by one or more leaf nodes of the sub-graphs, wherein each leaf node corresponds to an ending edge of a layer (which corresponds to one or more nodes) created by the compiler 102 by executing one or more primitive functions/operators on one or more hardware components. In some embodiments, the well-defined boundary of the layer corresponds to executing last primitive function/operator in a sub-graph on the hardware components for the layer. In some embodiments, the functionality of this last primitive function/operator can also be mapped back to its corresponding one or more ML operations in the ML network model. The compiler 102 is then configured to generate an internal/interim representation of each of the plurality of sub-graphs, wherein the internal representation maps to one or more components of the ML-specific hardware 106. In some embodiments, the compiler 102 generates the internal representations of the sub-graphs based on knowledge of one or more of the current architecture, configurations, and software/system requirements of the ML-specific hardware 106 in order to map the internal representation of the sub-graphs to the ML-specific hardware 106 as efficient and as optimized as possible (e.g., from hardware perspective and/or software perspective). For non-limiting examples, the compiler 102 may take certain actions and make certain decisions to reduce one or more of data movement, data conversions, storage usage, computation (or duplication of computation), and communication (by duplicating compute if beneficial), etc.

Figure 3A:
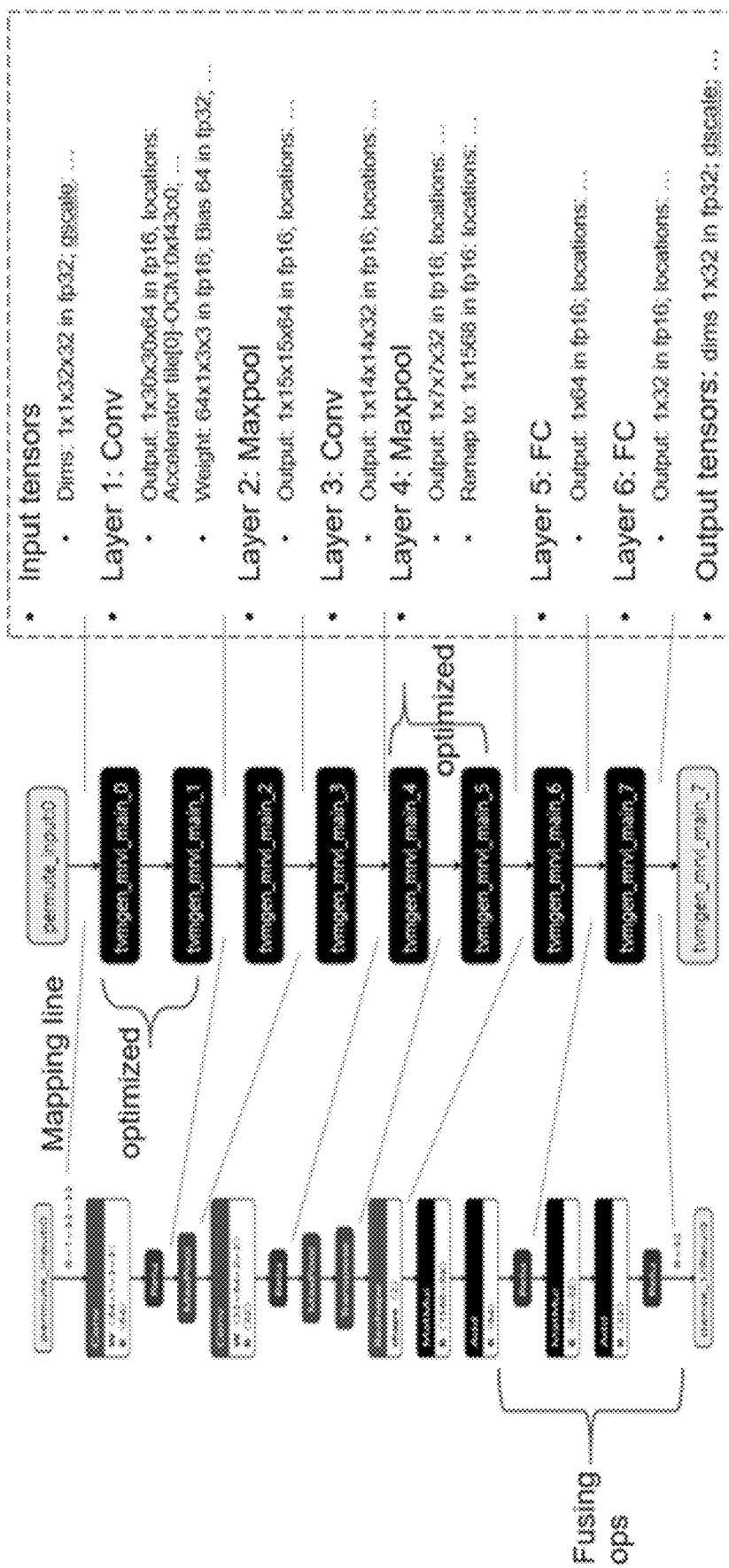
FIG. 3A depicts a non-limiting example of a pre-trained ML network model mapped to internal representation and to layers to be used by the compiler to generate low-level instructions to be executed on the ML-specific hardware according to one aspect of the present embodiments.
Figure 3B:
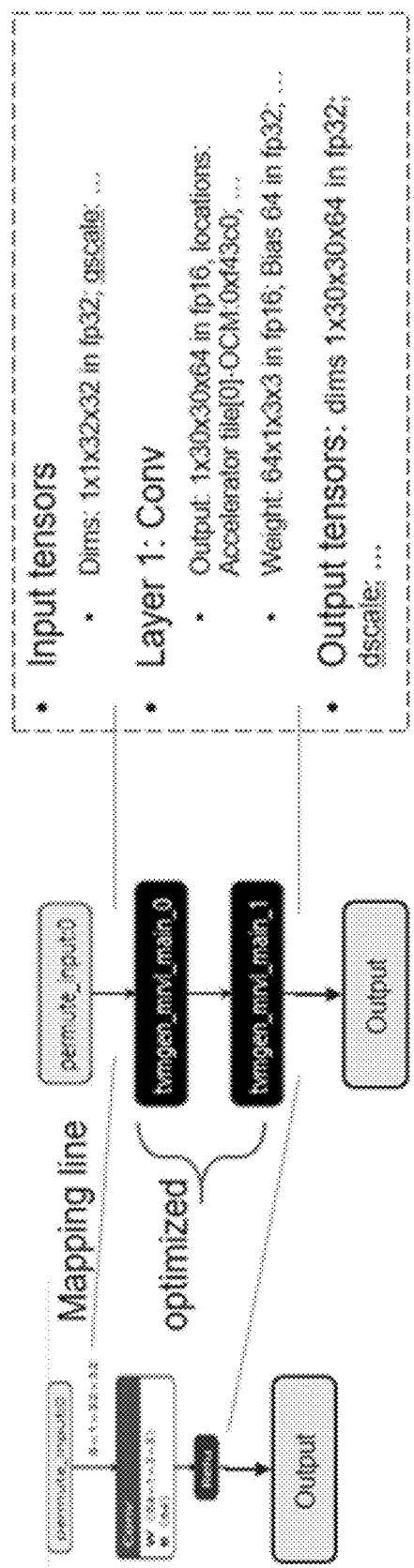
FIG. 3B depicts a non-limiting example of well-defined sub-graphs of the CNN model in FIG. 3A where layer Id=1 according to one aspect of the present embodiments.
Figure 3C:
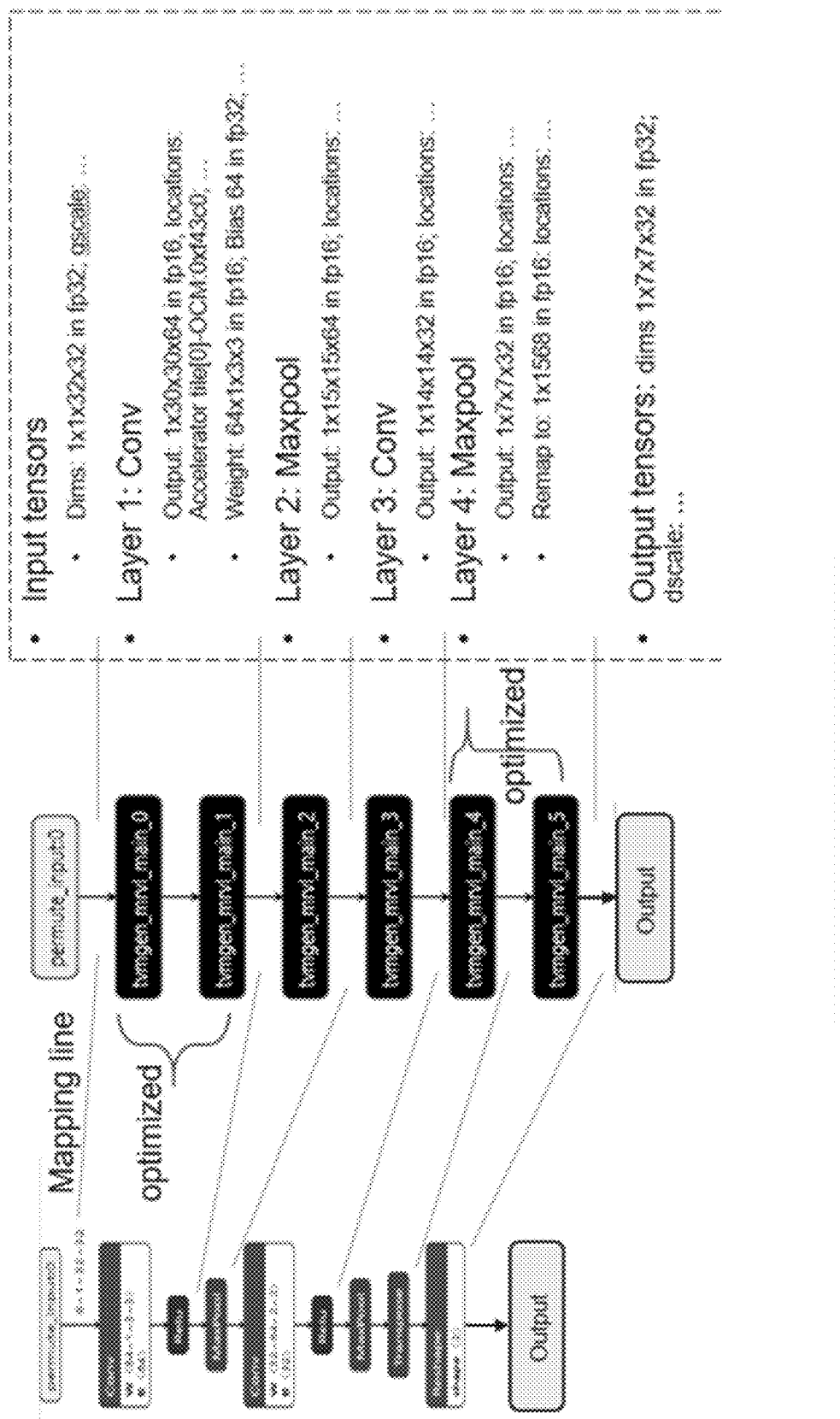
FIG. 3C depicts a non-limiting example of well-defined sub-graphs of the CNN model in FIG. 3A where layer Id=4 according to one aspect of the present embodiments.
Figure 3D:
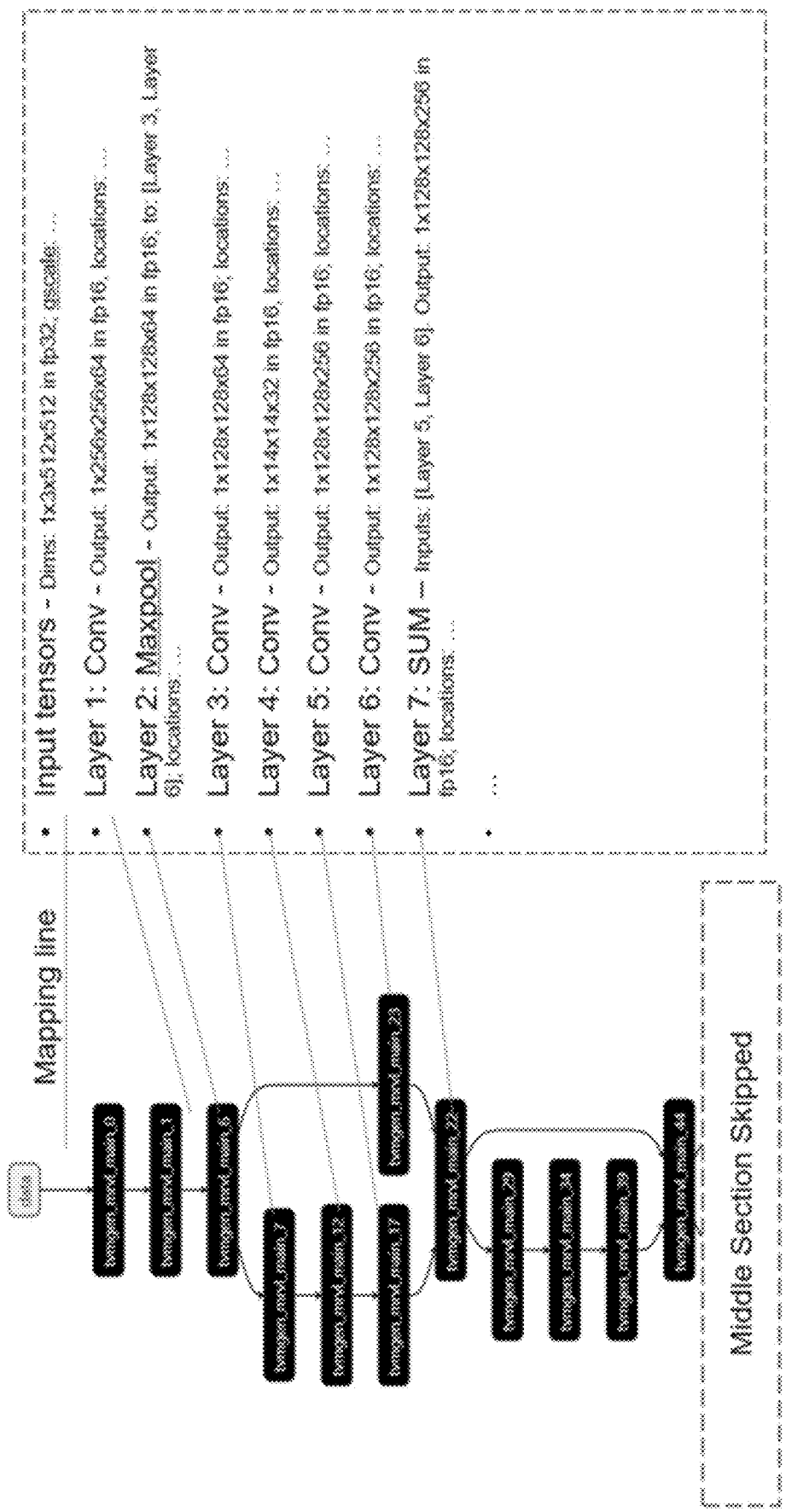
FIG. 3D depicts a non-limiting example of an internal representation for a more complex ssd-resnet50 network model according to one aspect of the present embodiments.

In some embodiments, each sub-graph is assigned a layer with a layer identifier or id and attribute descriptions that are specific to the mapped one or more components of the ML-specific hardware 106. FIG. 2 depicts a non-limiting example of layer ids and attribute descriptions of a list of sub-graphs mapped to components of the ML-specific hardware 106. In some embodiments, a sub-graph with well-defined boundaries can be identified based on the layer id or by providing additional "rules", for non-limiting examples, (a) the layer has two output tensors with 1st tensor's size >1M elements; or (b) the layer is the one at layer id K or just before layer id K. These rules can be utilized by the compiler 102 to parse the attribute descriptions to identify the sub-graphs for validation. In some embodiments, the compiler 102 is configured to identify the sub-graphs of the ML network model having well-defined boundaries for the ML-specific hardware 106 based on how each of the primitives in the ML network model is mapped to the internal representation generated by the compiler 102 for the ML-specific hardware 106 in order to generate low-level instructions to be executed on the ML-specific hardware 106. FIG. 3A depicts a non-limiting example of a CNN model as a pre-trained ML network model mapped to internal representation and to layers to be used by the compiler 102 to generate low-level instructions to be executed on the ML-specific hardware 106. FIG. 3B depicts a non-limiting example of a well-defined sub-graph (shown in different forms) of the CNN model in FIG. 3A where layer Id=1. FIG. 3C depicts a non-limiting example of another well-defined sub-graph (also shown in different forms) of the CNN model in FIG. 3A where layer Id=4. FIG. 3D depicts a non-limiting example of an internal representation for a more complex ssd-resnet50 network model (with its middle section skipped).

Figure 4:
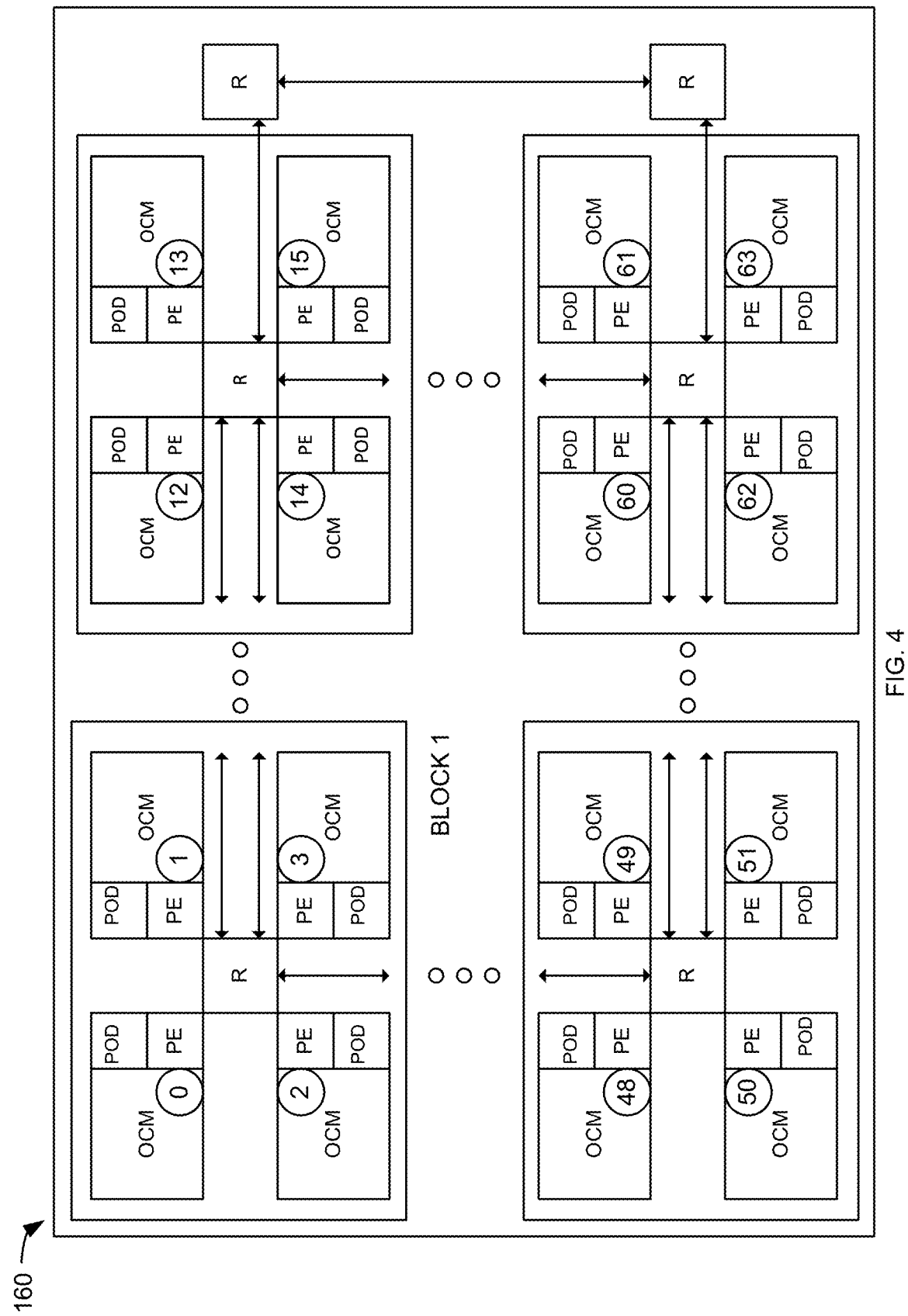
FIG. 4 depicts a non-limiting example of an inference engine that includes a plurality of processing tiles arranged in a two-dimensional array of a plurality of rows and columns according to one aspect of the present embodiments.

In the example of FIG. 1, the ML-specific hardware 106 is a dedicated hardware including one or more microprocessors and/or on-chip memory (OCM) units storing the data and/or the set of low-level instructions compiled from the high-level code by the compiler 102 to perform one or more ML operations. At runtime, the ML-specific hardware 106 is configured to retrieve the set of low-level instructions and/or data from the compiler 102 and execute the set of low-level instructions to perform the one or more ML operations according to the set of low-level instructions. For a non-limiting example, the ML-specific hardware 106 can be but is not limited to an inference engine, which is configured to infer and identify a subject via an inference operation from data input according to the ML network model. FIG. 4 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler 102. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1. It is appreciated that the ML-specific hardware 106 depicted in FIG. 4 is provided for illustrative purposes and should not be construed as limiting the scope of the embodiments.

In some embodiments, the compiler 102 is configured to compile each of the plurality of sub-graphs of the ML network model into two sets of low-level instructions—a first (e.g., to-be-verified) set of low-level instructions to be executed on the one or more hard components in the ML-specific hardware 106 and a second (e.g., proven) set of low-level instructions to be executed on a second computing device 108. Here, the second computing device 108 can be but is not limited to a general purposed computing device (e.g., a general purposed CPU or GPU), another (a second) ML-specific hardware that is different from (e.g., an earlier version of) the ML-specific hardware 106, a virtual machine to emulate a general purposed CPU (e.g., TVM-llvm-for- CPU), or any other type of computing hardware. In some embodiments, the compiler 102 is configured to choose one of the plurality of sub-graphs to compile based on the layer id of the sub-graph. In some embodiments, the compiler 102 is configured to choose to compile the entire/full ML network model. In some embodiments, the compiler 102 is configured to choose to compile a random set of sub-graphs of the ML network model to balance code coverage, resource, and time constraints of the validation process.

In some embodiments, the compiler 102 is configured to utilize/invoke a call to the ML library 104, which can be a hardware abstraction layer, to generate the first set of low-level instructions of the sub-graph to be executed on the ML-specific hardware 106. In some embodiments, the first set of low-level instructions complied by the compiler 102 for the ML-specific hardware 106 are in the format of ISA designed for efficient data processing covering and having for non-limiting examples, one or more of different addressing modes, native data types, registers, memory architectures, and interrupts. In some embodiments, when being executed on the ML-specific hardware 106, the first set of low-level instructions in the ISA format program the ML-specific hardware 106 by one or more of: (i) programming one or more input data streams to the ML-specific hardware 106; (ii) programming one or more operations to be performed on the input data streams; and (iii) programming one or more output data streams from ML-specific hardware 106.

In some embodiments, the first and/or second set of low-level instructions complied by the compiler 102 can be designated, for run-time performance reasons (e.g., for faster latency, for less memory footprint, and/or for smaller power consumption), to adopt various precisions and/or resolutions. Here, precision/resolution options include but are not limited to integer 8 (int8) element values, float-point-16-bit (fp16) element values, and/or float-point-32-bit (fp32) element values. In some embodiments, the precision/resolution options are specified in attribute descriptions depicted in FIG. 2, e.g., element-type-based domain-specific descriptions and locations.

Once the two sets of low-level instructions have been compiled by the compiler 102, they are loaded onto and executed on the ML-specific hardware 106 and the second computing device 108, respectively, under the same input data (e.g., inference input for an ML operation) as shown in FIG. 1. In some embodiments, the first and the second output results from executing the two sets of low-level instructions are collected from the ML-specific hardware 106 and the second computing device 108 in multi-dimensional tensor formats, respectively. Here, the multi-dimensional output tensors include different element types (int8, fp16 and fp32, and etc.) and multiple components and/or memory (e.g., OCM) locations of the ML-specific hardware 106. In some embodiments, the second output from executing the second (e.g., proven) set of low-level instructions on the second computing device 108 is utilized as the golden/standard output for validation and debugging of the first output from executing the first set of low-level instructions on the ML-specific hardware 106 as discussed below. In some embodiments, the two sets of low-level instructions may be run under different sets of input data such as large test suites covering different configurations of the ML-specific hardware 106 (e.g., different number of tiles, different memory size) as automation is applied. In some embodiments, the test suites may be run after any new sets of low-level instructions are compiled or may on regular schedule (e.g., at nightly or weekly basis).

In the example of FIG. 1, the validation engine 110 is configured to accept the first and the second output results from the ML-specific hardware 106 and the second computing device 108, respectively, and to validate and/or debug the first set of low-level instructions executed on the ML-specific hardware 106 using the second output result from the second computing device 108 as the golden standard. In some embodiments, the validation engine 110 is configured to utilize domain-specific attribute descriptions of the ML network model to facilitate the validation and debugging process. In some embodiments, various attributes including but not limited to dimensions, shapes, element types of the first output results can be inferred by the validation engine 110 from the-attribute descriptions generated for the ML-specific hardware 106. For a non-limiting example of a $10^{th}$ row of an output tensor having format and dimensions of NHWC-1×14×14×32, the validation engine 110 is configured to examine correctness only from output-tensor[1×8×14×32] to output-tensor[1×9×14×32−1], which represent the 1st element for the 10-th row and the last element for the 10-th row, respectively. In some embodiments, the validation engine 110 is configured to utilize run-time based information of the ML-specific hardware 106, e.g., how each output element is mapped to which tile of the ML-specific hardware 106, where in OCM memory locations, and in what element types, to facilitate debugging of the first set of low-level instructions. For a non-limiting example, the validation engine 110 is configured to infer subgraph and attribute descriptions and to dump actual "raw" memory bytes for checking and validation bases on how the output tensor is mapped onto the tiles, OCMs, and their locations in the ML-specific hardware 106.

In some embodiments, the validation engine 110 is configured to compare and measure the differences between the actual values of each element of the first output result from the ML-specific hardware 106 with the golden values of the corresponding elements of the second output result. The correctness of the first set of low-level instructions can be validated automatically if the two values match exactly or approximately. In some embodiments, the correctness of the first set of low-level instructions is validated taking into account the expected accuracy difference due to different precisions under per tensor-based rules provided either manually or in the attribute descriptions. For a non-limiting example, layer id 1 depicted in FIG. 2 has per output tensor attributes as: "data_match": {"delta": 2, "float_small_diff_value_treated_as_0": "0.0007" }, where difference less than 0.0007 is treated as a match. For another non-limiting example, the two output values are regarded as matched if the difference between them is within 1% (wherein each one "delta" unit corresponds to 0.5% allowed difference). If the actual values of all elements of the first output result match with the golden values of the all corresponding elements of the second output result, the first set of low-level instructions compiled from the current sub-graph is validated and confirmed. The compiler 102 may then select another sub-graph and repeat the same validation process until all of the plurality of the sub-graphs of the ML network model have been validated.

In some embodiments, the validation engine 110 is configured to examine and debug the first set of low-level instructions compiled from the current sub-graph if there is any mismatch between the first output results and the second output results. In some embodiments, the validation engine 110 is configured to debug the first set of low-level instructions to identify any issue or bug based on the well-defined boundaries of the primitives that call the ML library 104 to generate the first set of low-level instructions. In some embodiments, the issue may be related to be functional correctness and/or performance of the first set of low-level instructions and/or the compiler 102 that compiles the first set of low-level instructions, wherein such issue causes the mismatch between the first output results and the second output results. The validation engine 110 may then identify the corresponding sub-graphs of ML network model and/or its ML operations. In some embodiments, the validation engine 110 is configured to create one or more summary dashboards, which provide status and trends to indicate the validation coverage and health of the compiler 102 in terms of performance, correctness and achieved accuracy levels of the set of low-level instructions compiled for the ML-specific hardware 106.

If any issue is identified in the first set of low-level instructions, the validation engine 110 is configured to report the issue to the compiler 102. The compiler 102 then fixes the issue at the corresponding layer of the current sub-graph and recompile the first set of low-level instructions. In some embodiments, the debugging and fixing of the issue may require interactions with a developer of the compiler 102. The recompiled first set of low-level instructions can be then be validated again as discussed above. For a non-limiting example, in the layer id-subgraph-attribute descriptions depicted in FIG. 2, "first_inst_id: 52, last_inst_id: 190", is used to identify ISA instructions that are executed by the ML-specific hardware 106 in order to produce final output tensor(s) for layer 2. When the compiler 102 generates the ISA instructions to run on the ML-specific hardware 106, the compiler 102 also annotates the ISA instructions with one or more of layer id, ids for tasks/instructions, primitive names and arguments so that developer and the validation engine 110 can identify them for manual debugging and auto re-run, respectively. In some embodiments, the validation engine 110 is configured to examine the first output results maintained in one or more tracker files, which capture snapshots of various components of the ML-specific hardware 106 including but not limited to tiles, OCMs, and other architecture-level hardware components (e.g., register buffers, instruction queues, communication channels, hardware flags, hardware performance counters just to name a few) on a step by step per ISA instruction basis. Some of these snapshots can also be gathered by inquiring hardware (status) register and memory sub-modules of the ML-specific hardware 106.

In some embodiments, the validation engine 110 is configured to perform a unit test for each call in the ML network model to the ML library 104. In some embodiments, the validation engine 110 is configured to accept an output created by the unit test (e.g., by executing a C routine) as the golden output and to compare the golden output against the output results from executing the first set of low-level instructions generated by the ML library call and executed on the ML-specific hardware 106 (or its software emulator). In some embodiments, the unit test can be configured via an XML file, wherein the XML file specifies one or more of min/max values of different input parameters for the unit test, number of permutations to run for the unit test, and the schedule or frequency of the unit test (e.g., run nightly with a random seed). FIG. 5A depicts a non-limiting example of an ML library call (Int8Memset) for the unit test, FIG. 5B depicts a non-limiting example of the XML file specifying the unit test for Int8Memset, and FIG. 5C depicts a non-limiting example of the set of low-level instructions (e.g., in ISA format) generated by the ML library call Int8Memset.

In some embodiments, the validation engine 110 is configured to perform a validation process that compares different hardware architectures in terms of performance as well as data accuracy using identical ML network model representation (e.g. same ONNX file) and identical input data (e.g. same pre-processed input given in Json). In some embodiments, the validation engine 110 is configured to compare output results of low-level instructions compiled from completely different model optimizations and compile processes and executed on very different hardware architectures (actual or simulated/emulated) at different precisions. In some embodiments, the validation engine 110 is configured to compare archived result that was generated earlier. In some embodiments, the validation engine 110 is configured to utilize various limits and options of data accuracy or precision for comparisons, including but not limited to one or more of statistical (different error norms, such as L2norm), point-wise comparisons, and absolute or relative error bars. In some embodiments, the validation engine 110 is configured to express the error bars between the output results as units of precision when comparing quantized (e.g., int8) result that is dequantized to floating point. For a non-limiting example, an output range of −1 to 1 is quantized to int8, wherein each int8 values covers range of 0.008. As such, two values that are different by 0.008 equal to one unit off in the quantized int8 result.

Figure 6:
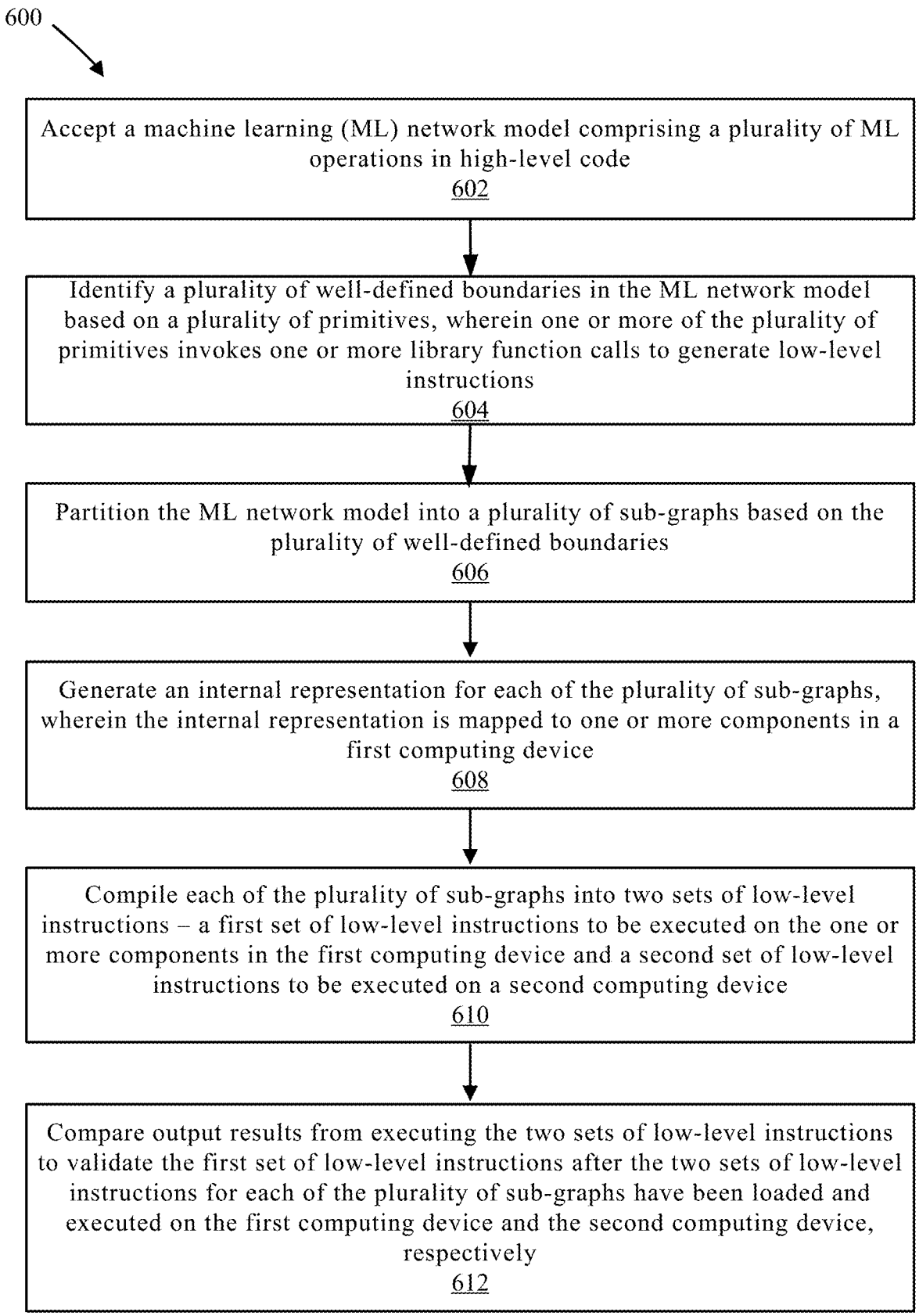
FIG. 6 depicts a flowchart of an example of a process to support validation and debugging of compiled low-level instructions being executed on an ML-specific hardware according to one aspect of the present embodiments.

FIG. 6 depicts a flowchart 600 of an example of a process to support validation and debugging of compiled low-level instructions being executed on an ML-specific hardware. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the flowchart 600 starts at block 602, where a machine learning (ML) network model comprising a plurality of ML operations in high-level code is accepted. The flowchart 600 continues to step 604, where a plurality of well-defined boundaries in the ML network model are identified based on a plurality of primitives, wherein one or more of the plurality of primitives invokes one or more library function calls to generate low-level instructions. The flowchart 600 continues to step 606, where the ML network model is partitioned into a plurality of sub-graphs based on the plurality of well-defined boundaries. The determining of the one or more processing operations occurs based on architecture of the hardware. The flowchart 600 continues to step 608, where an internal representation for each of the plurality of sub-graphs, wherein the internal representation is mapped to one or more components in a first computing device is generated. The flowchart 600 continues to step 610, where each of the plurality of sub-graphs is compiled into two sets of low-level instructions—a first set of low-level instructions to be executed on the one or more components in the first computing device and a second set of low-level instructions to be executed on a second computing device. The flowchart 600 ends at step 612, where output results from executing the two sets of low-level instructions are compared to validate the first set of low-level instructions after the two sets of low-level instructions for each of the plurality of sub-graphs have been loaded and executed on the first computing device and the second computing device, respectively. Note that the flowchart 600 can be applied through multiple divide-and-conquer iterations. For a non-limiting example, given the example of the network model depicted in FIG. 3A, a first iteration of the flowchart 600 may focus on validating the sub-graph depicted in the example of FIG. 3B. Once the example of the sub-graph of FIG. 3B has been validated without issues, the second iteration of the flowchart 600 may focus on validating the bigger sub-graph depicted by the example of FIG. 3C and so on.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:
   a compiler configured to
      accept a machine learning (ML) network model comprising a plurality of ML operations in high-level code;
      identify a plurality of boundaries in the ML network model based on a plurality of primitives, wherein one or more of the plurality of primitives invokes one or more library function calls to generate low-level instructions;
      partition the ML network model into a plurality of sub-graphs based on the plurality of boundaries;
      generate an internal representation for each sub-graph of the plurality of sub-graphs, wherein the internal representation is mapped to one or more components in a first computing device; and
      compile the plurality of sub-graphs into a first set of low-level instructions and compile the plurality of sub-graphs into a second set of low-level instructions, wherein the first set of low-level instructions is transmitted to the first computing device for execution thereof, and wherein the second set of low-level instructions is transmitted to a second computing device for execution thereof.

2. The system of claim 1, further comprising:
   a validation engine configured to compare a first output and a second output from the first computing device and the second computing device executing the first and the second set of low-level instructions, respectively, to validate the first set of low-level instructions.

3. The system of claim 2, wherein:
   the validation engine is configured to collect the first output and the second output from executing the two sets of low-level instructions in multi-dimensional tensor formats.

4. The system of claim 2, wherein:
   the validation engine is configured to utilize the second output from executing the second set of low-level instructions on the second computing device as a golden standard for validation and debugging of the first output from executing the first set of low-level instructions on the first computing device.

5. The system of claim 4, wherein:
   the validation engine is configured to
      measure difference between values of each element of the first output with the golden standard of corresponding elements of the second output; and
      validate the first set of low-level instructions automatically if the values match exactly or approximately taking the expected accuracy difference due to different precisions into account under per output-based rules.

6. The system of claim 5, wherein:
   the validation engine is configured to examine and debug an issue in the first set of low-level instructions compiled if there is any mismatch between the first output and the second output, wherein the issue causes the mismatch between the first output and the second output.

7. The system of claim 6, wherein:
   the compiler is configured to fix any issue and recompile the first set of low-level instructions if any issue is identified.

8. The system of claim 2, wherein:
   the validation engine is configured to perform a unit test for each call in the ML network model to an ML library.

9. The system of claim 2, wherein:
   the validation engine is configured to perform a validation process that compares different hardware architectures based on performance and/or data accuracy using identical ML network model representation and input data.

10. The system of claim 1, wherein:
    the first computing device is an ML-specific hardware or a software emulator of the ML-specific hardware, wherein the ML-specific hardware is a dedicated hardware including one or more microprocessors and/or on-chip memory (OCM) units storing data and/or the first set of low-level instructions to perform the plurality of ML operations.

11. The system of claim 1, wherein:
    the second computing device is one of a general-purposed computing device, a special purposed hardware that is different from the first computing device, or a software emulator of a hardware.

12. The system of claim 1, wherein:
    the first computing device and the second computing device are two separate devices.

13. The system of claim 1, wherein:
    the first computing device and the second computing device are different components and/or chips integrated on a same physical device.

14. The system of claim 1, wherein:
    the ML network model is represented by a neural network used for the plurality of ML operations.

15. The system of claim 1, wherein:
    the compiler is configured to generate the internal representations of the plurality of sub-graphs based on knowledge of one or more of architecture, configurations, and software/system requirements of the first computing device.

16. The system of claim 1, wherein:
    each sub-graph of the plurality of sub-graphs is assigned a layer with a layer id and attribute descriptions that are specific to the mapped one or more components of the first computing device.

17. The system of claim 16, wherein:
    the compiler is configured to utilize one or more rules to parse the attribute descriptions to identify the plurality of subgraphs for validation.

18. The system of claim 1, wherein:
    the compiler is configured to identify the plurality of sub-graphs of the ML network model based on how one or more of the plurality of primitives in the ML network model is mapped to internal representations for the first computing device.

19. The system of claim 1, wherein:
the compiler is configured to compile the first and/or second set of low-level instructions to adopt a plurality of precisions and/or resolutions.

20. A method, comprising:
accepting a machine learning (ML) network model comprising a plurality of ML operations in high-level code;
identifying a plurality of boundaries in the ML network model based on a plurality of primitives, wherein one or more of the plurality of primitives invokes one or more library function calls to generate low-level instructions;
partitioning the ML network model into a plurality of sub-graphs based on the plurality of boundaries;
generating an internal representation for each sub-graph of the plurality of sub-graphs, wherein the internal representation is mapped to one or more components in a first computing device;
compiling the plurality of sub-graphs into a first set of low-level instructions, wherein the first set of low-level instructions is transmitted to the first computing device for execution thereof; and
compiling the plurality of sub-graphs into a second set of low-level instructions, wherein the second set of low-level instructions is transmitted to a second computing device for execution thereof.

21. The method of claim 20, further comprising:
comparing a first output and a second output from the first computing device and the second computing device executing the first and the second set of low-level instructions, respectively, to validate the first set of low-level instructions.

22. The method of claim 21, further comprising:
collecting the first output and the second output from executing the two sets of low-level instructions in multi-dimensional tensor format.

23. The method of claim 21, further comprising:
utilizing the second output from executing the second set of low-level instructions on the second computing device as a golden standard for validation and debugging of the first output from executing the first set of low-level instructions on the first computing device.

24. The method of claim 23, further comprising:
measuring difference between values of each element of the first output with the golden standard of corresponding elements of the second output; and
validating the first set of low-level instructions automatically if the values match exactly or approximately taking the expected accuracy difference due to different precisions into account under per output-based rules.

25. The method of claim 24, further comprising:
examining and debugging an issue in the first set of low-level instructions compiled if there is any mismatch between the first output and the second output, wherein the issue causes the mismatch between the first output and the second output.

26. The method of claim 25, further comprising:
fixing any issue and recompiling the first set of low-level instructions if any issue is identified.

27. The method of claim 20, further comprising:
generating the internal representations of the plurality of sub-graphs based on knowledge of one or more of architecture, configurations, and software/system requirements of the first computing device.

28. The method of claim 20, further comprising:
assigning each sub-graph of the plurality of sub-graphs a layer with a layer id and attribute descriptions that are specific to the mapped one or more components of the first computing device.

29. The method of claim 28, further comprising:
utilizing one or more rules to parse the attribute descriptions to identify the plurality of subgraphs for validation.

30. The method of claim 20, further comprising:
identifying the plurality of sub-graphs of the ML network model based on how each of the plurality of primitives in the ML network model is mapped to the internal representations for the first computing device.

31. The method of claim 20, further comprising:
compiling the first and/or second set of low-level instructions to adopt a plurality of precisions and/or resolutions.

32. The method of claim 20, further comprising:
performing a unit test for each call in the ML network model to an ML library.

33. The method of claim 20, further comprising:
performing a validation process that compares different hardware architectures based on performance and/or data accuracy using identical ML network model representation and input data.

34. A system, comprising:
a means for accepting a machine learning (ML) network model comprising a plurality of ML operations in high-level code;
a means for identifying a plurality of boundaries in the ML network model based on a plurality of primitives, wherein one or more of the plurality of primitives invokes one or more library function calls to generate low-level instructions;
a means for partitioning the ML network model into a plurality of sub-graphs based on the plurality of boundaries;
a means for generating an internal representation for each sub-graph of the plurality of sub-graphs, wherein the internal representation is mapped to one or more components in a first computing device;
a means for compiling the plurality of sub-graphs into a first set of low-level instructions, wherein the first set of low-level instructions is transmitted to the one or more components in the first computing device for execution thereof; and
a means for compiling the plurality of sub-graphs into a second set of low-level instructions, wherein the second set of low-level instructions is transmitted to a second computing device for execution thereof.

* * * * *